United States Patent [19]

Harrer, deceased et al.

[11] 4,053,573
[45] Oct. 11, 1977

[54] RECOVERY OF SULFUR VALUES FROM SPENT SULFURIC ACID

[75] Inventors: T. S. Harrer, deceased, late of Stratford, N.J., by Eunice Harrer, executrix; Bela I. Karsay, DeWitt; Robert L. Sturtevant, Baldwinsville, both of N.Y.

[73] Assignee: Allied Chemical Corporation, Morris Township, N.J.

[21] Appl. No.: 633,765

[22] Filed: Nov. 20, 1975

[51] Int. Cl.$^2$ .................... C01B 17/50; C01B 17/72; C01B 17/90
[52] U.S. Cl. ................................ 423/540; 423/525; 423/531; 423/543; 423/DIG. 2
[58] Field of Search ............... 423/511, 525, 526, 527, 423/529, 530, 531, 539, 539 A, 540, 541, 541 A, 542, 543, 562, 565, 566, 561 R, 561 A, 659 A, 48

[56] References Cited

U.S. PATENT DOCUMENTS

| | | | |
|---|---|---|---|
| 3,359,069 | 12/1967 | Furkert | 423/540 |
| 3,667,908 | 6/1972 | Torrence | 423/539 |
| 3,810,968 | 5/1974 | Renault et al. | 423/541 A |
| 3,833,715 | 9/1974 | Deschamps et al. | 423/541 A |

OTHER PUBLICATIONS

Beck et al., Alein Property Custodian, Ser. No. 393,258, July 13, 1943.

*Primary Examiner*—O. R. Vertiz
*Assistant Examiner*—Gary P. Straub
*Attorney, Agent, or Firm*—Gerhard H. Fuchs

[57] ABSTRACT

Improvement in the method for recovering sulfur values in the form of sulfur dioxide from spent sulfuric acid by decomposing the spent sulfuric acid at elevated temperature in the presence of elemental sulfur to generate a sulfur dioxide-containing gas stream, which involves: (a) introducing the spent sulfuric acid into a pool of molten sulfur maintained at temperature of at least about 250° C. to thereby generate a gaseous stream comprising sulfur dioxide, vaporous elemental sulfur, and water; (b) cooling said gaseous stream to temperature above the melting point of the sulfur but below about 160° C. to condense elemental sulfur therefrom, separating the condensed elemental sulfur and returning it to the pool of molten sulfur; followed by (c) further cooling the gaseous stream from which elemental sulfur has been condensed to condense water therefrom, and separating the condensed water from the gaseous stream.

19 Claims, 3 Drawing Figures

RECOVERY OF SULFUR VALUES FROM SPENT SULFURIC ACID

BACKGROUND OF THE INVENTION

This invention relates to production of sulfur dioxide from spent sulfuric acid containing impurities of organic or inorganic nature.

In several industrial processes there are formed large quantities of by-product or spent sulfuric acids of varying $H_2SO_4$ content, which contain varying amounts of impurities, of organic and inorganic nature. Spent or waste acids containing organic impurities may, for example, be derived from the sulfuric acid used in petroleum refining operations including the alkylation process, and from sulfuric acid used in sulfation, sulfonation, and nitration processes. Spent sulfuric acids containing inorganic impurities may, for example, be obtained from hydrometallurgical leaching operations, metal pickling operations, or in the process of making titanium dioxide pigment, and the like. Large amounts of such spent acids are produced daily and pose a serious disposal problem.

It is already known to recover sulfur values from spent sulfuric acids by decomposing them to form sulfur dioxide gas. For example, Merriam U.S. Pat. No. 2,389,071 describes a process for making suflur dioxide by spraying sulfuric acid containing organic impurities into a combustion chamber maintained at elevated temperature such that the temperature of the gas exiting the combustion chamber is not less than 900° F. while introducing vaporous sulfur into the combustion chamber to thereby reduce the $H_2SO_4$ constituent of the incoming spent acid to sulfur dioxide, in accordance with the equation $2H_2SO_4 + S \rightarrow 3SO_2 + 2H_2O$.

The reaction between sulfur and sulfuric acid to form sulfur dioxide and water has been investigated by F. Russell Bichowsky (J. Am. Chem. Soc. 44 [1922] p. 116 et seq.). Bichowsky reacted liquid sulfur with aqueous sulfuric acid in sealed tubes at elevated temperature and determined the free energy for the reaction $S + 2H_2SO_4 \rightarrow 2H_2O + 3SO_2$.

It is an object of the present invention to provide an improved process for recovering sulfur values in the form of sulfur dioxide from spent sulfuric acids, which can effectively handle spent acids of wide ranging sulfuric acid concentration, and containing organic as well as inorganic impurities.

SUMMARY OF THE INVENTION

In accordance with the present invention, an improvement is provided in the process for recovering sulfur values in the form of sulfur dioxide from spent sulfuric acid by decomposing it at elevated temperature in the presence of elemental sulfur to generate a sulfur dioxide-containing gas stream, which improvement comprises: (a) introducing spent sulfuric acid into a pool of molten sulfur maintained at temperature of at least about 250° C. to thereby generate a gaseous stream comprising sulfur dioxide, vaporous elemental sulfur and water; (b) cooling said gaseous stream comprising sulfur dioxide, vaporous elemental sulfur and water to temperature above the melting point of the sulfur but below about 160° C. to condense elemental sulfur therefrom, separating said condensed elemental sulfur and returning it to said pool of molten sulfur; followed by (c) further cooling the gaseous stream from which elemental sulfur has been condensed to condense water therefrom, and separating the condensed water from the gaseous stream.

In this improved process, the pool of molten sulfur furnishes reductant for the sulfur contained in the sulfuric acid which is to be decomposed to sulfur dioxide, as well as the reaction medium for carrying out the decomposition reaction.

The improved process of the present invention is capable of handling spent sulfuric acids of wide ranging $H_2SO_4$ concentration and containing organic as well as inorganic impurities, also within wide ranges of concentrations.

The reaction between sulfur and sulfuric acid at elevated temperature to form sulfur dioxide and water is endothermic. Heat must be supplied in order to sustain it. This can be conveniently accomplished by heating the pool of molten sulfur contained in the reactor wherein the decomposition reaction is conducted, as by indirectly contacting it with a heat exchange medium, e.g., by providing a jacketed reactor, by providing heating coils within the reactor, by circulating a stream taken from the pool of molten sulfur through an externally located heat exchanger, or by introducing oxygen or oxygen-containing gas directly into the pool of molten sulfur within the reactor to generate heat by combustion of sulfur therein.

If the spent acid being decomposed in accordance with the improved process of the present invention contains organic impurities, such as hydrocarbons contained in alkylation spent acid, these organic impurities generally will be converted to carbon, and the overall reaction of the decomposition of the spent alkylation or other inorganic impurity-containing acids may be represented by the following equation:

$$3H_2SO_4 + \text{+CH}_2\text{+} + S \rightarrow 4SO_2 + 4H_2O + C$$

wherein +CH$_2$+ represents the organic impurities contained in the acid. The above equation indicates that the hydrocarbons from spent acids containing the same also participate in the reduction of the sulfuric acid to sulfur dioxide. Indeed, it has been found that the hydrogen contained in such hydrocarbons is even more reactive with the sulfuric acid than the sulfur. Therefore, it appears that first dehydrogenation of the organic impurities takes place, resulting in decomposition of part of the sulfuric acid under formation of solid, nonvolatile carbonaceous matter and sulfur dioxide, in accordance with the equation

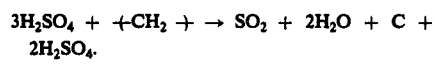

$$3H_2SO_4 + \text{+CH}_2\text{+} \rightarrow SO_2 + 2H_2O + C + 2H_2SO_4.$$

The solid, non-volatile carbonaceous matter accumulates in the pool of molten sulfur in finely divided form which, if not removed therefrom, would transform the pool of sulfur into an intractable slurry. In order to keep the concentration thereof at manageable levels, say below about 20% by weight of the sulfur, desirably part of the molten sulfur which furnishes the reaction medium is continuously or intermittently purged from the reaction medium.

The solid non-volatile carbonaceous matter can be removed from the purge stream by any convenient method, for example by sedimentation or filtration, and the purge stream from which the carbonaceous matter has been so removed can be returned to the liquid reaction medium. Alternatively, sulfur purged from the reactor containing such carbonaceous impurities can be used for other purposes. It can be burned, for example, and the heat generated by burning it can be used in an indirect heat exchanger to heat the sulfur in the reactor, e.g., by circulating a part of the pool of molten sulfur from the decomposition reactor through the externally located heat exchanger, thereby utilizing the heat generated by burning the carbonaceous matter-containing purge stream for maintaining the pool of molten sulfur in the reactor at desired temperature. The sulfur dioxide generated by burning the purge stream from the decomposition reactor will contain small amounts of carbon monoxide and/or carbon dioxide, but it is entirely suitable for making sulfuric acid, for example, in a contact plant.

In the event the spent sulfuric acid contains inorganic matter, as is the case with spent pickle liquors, liquors from hydrometallurgical processing, or sulfuric and residues from the titanium dioxide process, then the inorganic impurities, such as salts and their reduction products (sulfates and/or sulfites or sulfides) build up in solid form in the molten sulfur and must be removed therefrom, as by filtration.

BRIEF DESCRIPTION OF THE DRAWINGS

In the drawings, wherein like reference numerals denote like apparatus components.

FIG. 1, an embodiment is illustrated wherein spent acid containing organic impurities is decomposed in a pool of molten sulfur maintained in a reactor wherein a carbonaceous matter-containing sulfur purge stream is withdrawn from the reactor, is burned in a sulfur burner to generate heat, which in turn is used to supply heat for maintaining the pool of molten sulfur in the reactor at desired temperature.

FIG. 2 illustrates another specific embodiment of the improved process of the present invention wherein a stream of sulfur is withdrawn from the pool of molten sulfur in the reactor and is passed through a filter to remove solid impurities therefrom, and the filtered stream is returned to the reactor. In that embodiment oxygen-containing gas, such as air or pure oxygen is blown into the reactor itself to generate heat by burning sulfur directly in the reactor. This embodiment is particularly suitable for use with spent acids containing inorganic impurities.

FIG. 3 illustrates a further specific embodiment of the present invention wherein impurities are removed from the pool of molten sulfur by filtration, and wherein the pool of molten sulfur in the reactor is maintained at desired temperature by passing a stream thereof through an externally located heat exchanger.

Figure 1:
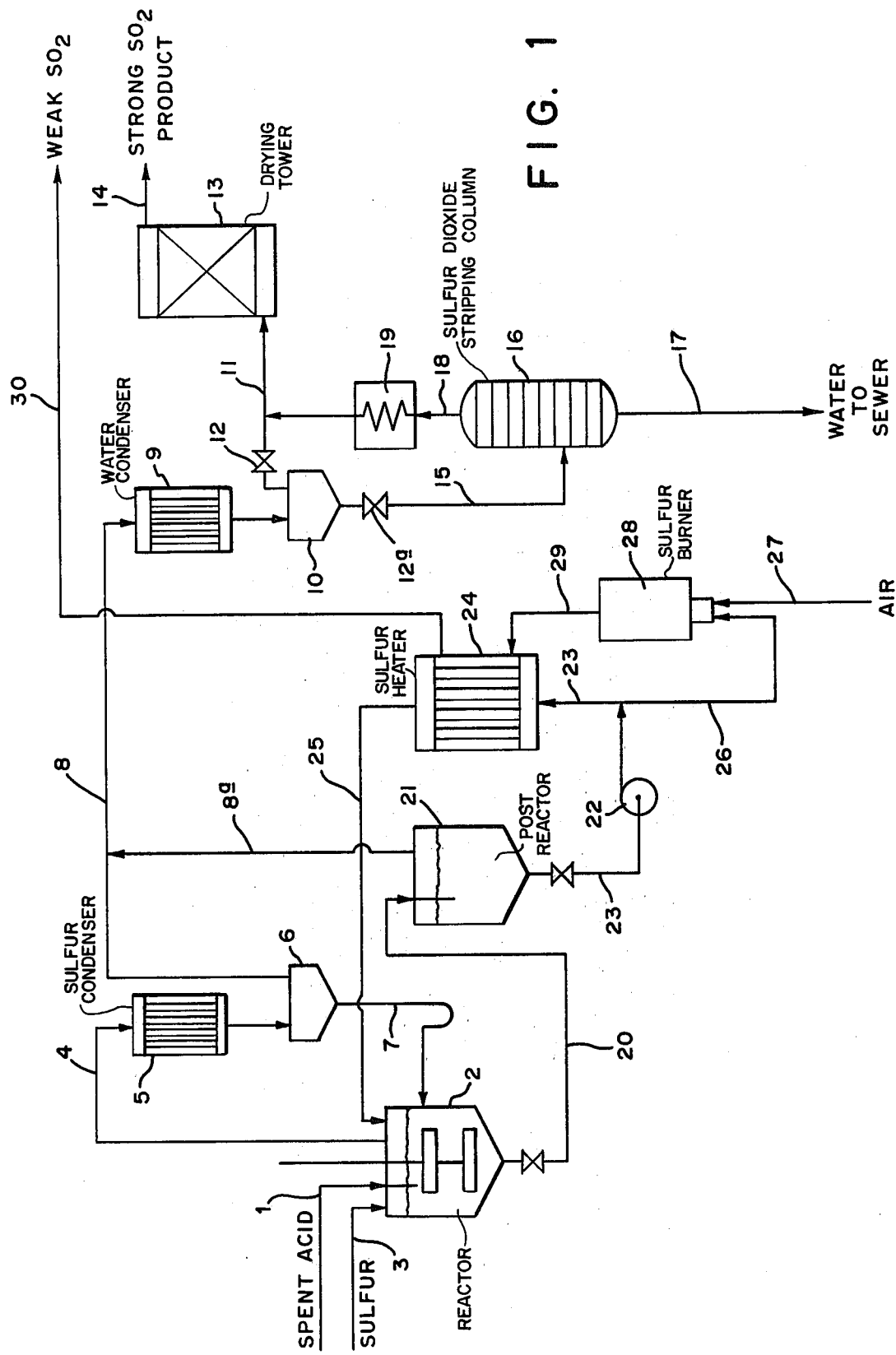
FIGS. 1, 2, and 3 are flow diagrams illustrating specific embodiments of the improved process of the present invention.

DETAILED DESCRIPTION OF THE INVENTION, OF THE PREFERRED EMBODIMENTS, AND OF THE BEST MODE CONTEMPLATED FOR ITS PRACTICE

In the improved process of the present invention, the pool of molten sulfur wherein decomposition of the spent acid is effected is held in a reaction vessel which may be designed for operation under superatmospheric pressure, if desired, which reaction vessel is constructed of suitable corrosion resistant material, such as stainless steel, or which is lined with acid and heat resistant brick. The reactor desirably is equipped with means for agitation, for example a paddle agitator. Other means for agitation, such as circulating pumps, may be employed with equally satisfactory results.

The pool of molten sulfur in the reactor is maintained at temperature above about 250° C., preferably above about 300° C., in order to obtain commercially acceptable decomposition rates and to operate within reasonably low viscosity range of the sulfur. Viscosity of liquid sulfur undergoes significant changes with temperature variations. Viscosity of purified sulfur at 120° C. is about 11 centipoises. On further heating the viscosity drops to about 6.7 centipoises at about 150° C., and then begins to rise to about 30 centipoises at 160° C., reaching a maximum of about 93,000 centipoises at 187° C. Above this temperature, the viscosity gradually drops off again to about 2,000 centipoises at 360° C. In order to maintain the sulfur in the pool of molten sulfur in the reactor at sufficiently low viscosity to permit thorough agitation, operating temperatures above about 300° C. are preferred. Most preferred are operating temperatures between about 350° C. and the boiling point of the sulfur at the chosen operating pressure. Operation at these temperatures permits good dispersion of the spent acid in the pool of molten sulfur, and avoids excessive foaming as the gaseous decomposition products evolve. There is no upper limit on the temperature of the pool of molten sulfur other than that dictated by the requirement that the sulfur be in liquid form.

At most desirable decomposition temperatures, that is to say above about 350° C., the vapor pressure of sulfur is appreciable so that the gas phase above the molten sulfur in the reactor contains an appreciable amount of sulfur vapor, which is available to react with any escaping sulfuric acid vapors. Sulfur thus evaporating is recovered and rerouted to the pool of molten sulfur in the reactor by passing the gaseous stream evolved from the reactor through a reflux condenser wherein it is cooled to temperature above the melting point of sulfur but below the point where viscosity of molten sulfur rapidly increases (below about 160° C.), suitably to temperature between about 120° and 150° C., preferably between about 125° and 135° C., to thereby insure high degree of sulfur removal from the gas by condensation.

The relatively high vaporization rate of sulfur at preferred operating temperatures and the relatively low temperature to which the sulfur is cooled in the reflux condenser prior to return to the pool of molten sulfur in the reactor result in removal of considerable amount of heat from the pool of molten sulfur in the reactor. The vaporization rate of the sulfur, and concomitant heat loss, can be reduced by conducting the decomposition reaction under superatmospheric pressure. Thus, although the improved process of the present invention can be effectively conducted under atmospheric pressure, it is preferably conducted under superatmospheric pressure, suitably in the order of about 1 to 100 atmospheres, preferably about 2 to 10 atmospheres. Superatmospheric pressure not only reduces the vaporization rate of the sulfur, but also increases the boiling point of both the sulfuric acid and the sulfur in the reactor, and thus permits conducting the decomposition reaction substantially in liquid phase at temperatures higher than otherwise possible.

The spent acid can be fed to the pool of molten sulfur in the reactor in many ways, such as by spraying or feeding it in one or more continuous streams onto or below the surface of the pool of molten sulfur under constant agitation of the pool. In a preferred embodiment, dip tubes are employed through which the spent acid is fed below the surface of the pool of molten sulfur. With properly designed dip tube arrangements, mechanical agitation of the pool of molten sulfur in the reactor may become unnecessary, since the gases which are generated by the reaction may provide sufficient agitation. Furthermore, the contact time between the spent acid and the pool of molten sulfur tends to be maximized by such an arrangement.

As previously stated, the improved process of the present invention is suitable for decomposing spent sulfuric acids of wide ranging $H_2SO_4$ content, containing both organic and inorganic impurities, of wide ranging concentrations and compositions. Such organic impurities-containing spent acids include, for example, sludge acids from petroleum refining operations, alkylation acids, and waste acids derived from sulfation, sulfonation, nitration and similar processes. Such inorganic impurities-containing acids such as pickle liquors, waste liquors from hydrometallurgical processes and waste acid from the sulfuric acid titanium dioxide process. Spent sulfuric acids containing a relatively high proportion of sulfuric acid, such as alkylation acids, are decomposed relatively fast. The decomposition of very dilute spent acids, such as pickle liquors and waste liquors from hydrometallurgical leach processes, which may contain up to about 70 or 90% of water, are decomposed at much lower rates because of the cooling and diluting effect of the water. Therefore, it may be desirable to preconcentrate such acids to sulfuric acid contents within the range of about 60 to 95% by weight, preferably about 70 to 80% by weight, based on the sulfuric acid, prior to decomposing them by the improved process of the present invention.

The rate of reaction between the spent sulfuric acid and the sulfur depends upon factors such as the $H_2SO_4$ concentration and composition of the acid, as well as on the chosen reaction temperature. As preferred reaction temperatures above about 300° C. and especially above about 350° C., the reaction proceeds at commercially acceptable rates. At about 370° C., the reaction is fast but still not instantaneous. It has been found that on start of continuous addition of alkylation spent acid containing about 90% sulfuric acid to a pool of molten sulfur maintained at temperature within the range of about 370° to 400° C., the reaction starts immediately. Steady state reaction rate at which the sulfur dioxide evolution corresponds to the rate of acid feed is usually reached within a few minutes. On termination of acid feed, the reaction continues until remaining sulfuric acid is consumed, and gas evolution may continue at substantially reduced rates for periods of up to about one hour or so. Since the reaction rate is not instantaneous but requires a certain time — which time depends on factors such as acid strength, acid composition, impurities composition, reaction temperature and pressure — a certain amount of sulfuric acid will usually be contained in the reaction medium which, if an externally located heat exchanger is employed for supplying heat to the reaction medium, could cause serious corrosion problems within that heat exchanger. For that reason, it may be desirable to provide a post reaction chamber between the reactor and the heat exchanger, wherein the sulfur being circulated between the reactor and the heat exchanger may be given sufficient retention time to permit completion of the reaction.

The amount of hydrocarbon content of organic impurities containing waste sulfuric acids does have a pronounced effect on the decomposition rate. The hydrogen contained in the organic impurities seems to act as a primary reducing agent for the sulfuric acid, as above described. Spent acids of high organic content tend to decompose faster, and tend to consume less sulfur than spent acids of low organic content. On the other hand, however, spent acids of high organic content also leave a larger amount of solid carbonaceous residue in the pool of molten sulfur, and require a high rate of purging to eliminate that residue from the reactor.

Decomposition of spent sulfuric acids in accordance with the improved method of the present invention results in accumulation of solid residue in the pool of molten sulfur wherein the decomposition is conducted. This solid residue may be of carbonaceous or inorganic nature. Unless such solid residue is removed from the pool of molten sulfur, the sulfur would turn into a thick slurry which could not be agitated. Mode or removal of the solid residue would depend upon its character and desired utilization. Removal of carbonaceous residue resulting from decomposition of spent acids containing organic matter, such as sludge acid, alkylation acid, sulfonation, sulfation or nitration acid can most practically be accomplished by purging a stream of molten sulfur from the reactor and burning it to form sulfur dioxide, which then may be used in a sulfuric acid plant for making sulfuric acid. Under some circumstances, such as when high reaction temperatures are employed to decomposte spent acids of low organic content, purging may be accomplished by blowing air or oxygen directly into the pool of molten sulfur, thereby burning at least a portion the carbonaceous residue together with some of the sulfur to form carbon dioxide, and sulfur dioxide. Carbonaceous residues can also be removed from the sulfur by filtration. Filtration generally will be the preferred method for removal of inorganic residues, such as may originate from decomposition of metallurgical spent acids.

The gas stream resulting from decomposition of spent sulfuric acid in accordance with the present invention principally contains sulfur dioxide, vaporous elemental sulfur, water and, if the spent acid contained organic matter, some carbon dioxide and carbon monoxide. From the decomposition reactor this gas is passed through a first condenser, which is a reflux condenser, to condense vaporous elemental sulfur — together with sulfuric acid, if any, which may have been evaporated in the reactor. The condensate is separated and returned to the pool of molten sulfur in the reactor.

The gaseous stream comprising sulfur dioxide and water from which elemental sulfur has been thus removed is then passed through a second condenser wherein it is cooled to a temperature between the freezing point and the boiling point of the water at prevailing operating pressures, usually between about 1° and about 99° C.; conveniently between about ambient (about 20° C.) and 80° C. to condense out the bulk of the water. Removal of water by condensation in this manner is one of the most significant features of the improved process of the present invention. The water which is condensed from that stream represents the bulk of the water contained in the spent acid as well as of that resulting from the decomposition of the spent acid. If the first condensor is an efficient reflux condenser, then the water thus condensed, contains some dissolved sulfur dioxide (and perhaps very minor amounts of dispersed elemental sulfur), but is essentially free of sulfuric acid. Hence, it can ordinarily be directly passed to a sewer after stripping the dissolved sulfur dioxide therefrom. This is in distinct contrast to prior art spent acid decomposition processes wherein reaction between sulfuric acid and, optionally, sulfur is conducted in gas phase in which the water condensed from the system always contains significant amounts of sulfuric acid, which either must be neutralized prior to disposal, or which can be used in a sulfuric acid plant employing the contact process, but which use imposes an undesirably high water load on the process. Not only that, these prior art processes generally produce a gaseous stream relatively dilute in sulfur dioxide containing not more than about 6 to 14% by volume of sulfur dioxide from which, because of the high degree of dilution with non-condensible gases, little water condenses on cooling relative to the sulfur dioxide content of the gaseous stream. Therefore, if the sulfur dioxide-containing gas stream derived from said prior art processes is to be used in a contact sulfuric acid plant for making sulfuric acid, the water must be removed therefrom by drying, as by contacting it with a desiccant, such as sulfuric acid which thereafter is used for dilution of sulfuric acid process streams. In the event the contact sulfuric acid plant is to make strong sulfuric acid, an intolerably high water load may be imposed on the plant in that the amount of water recovered in the drying operation exceeds that required for making sulfuric acid by reaction with the sulfur trioxide generated by the contact process, thereby restricting the amount of spent acid that can be handled by the plant.

After passage through the second condenser, the sulfur dioxide-containing gas stream is passed through a water separator, usually an empty or packed vessel with a bottom outlet for the condensed water and a top outlet for the gaseous stream, permitting efficient separation of liquid and gaseous phases. The liquid phase, representing the condensed water containing dissolved sulfur dioxide, can then be passed through a sulfur dioxide stripping column wherein dissolved sulfur dioxide is removed by heating, optionally in conjunction with blowing inert gases through the water, and the water from which sulfur dioxide has been stripped can be sewered directly.

The sulfur dioxide-containing gas stream from which water has been condensed can be used, after drying as by contacting it with strong sulfuric acid and, optionally, dilution to furnish sulfur dioxide-containing feed gas for a contact sulfuric acid plant. Alternatively, the sulfur dioxide containing gas stream can be used in any other process or chemical operation requiring strong sulfur dioxide, or for making liquid sulfur dioxide.

Design, construction and operation of apparatus for carrying out the improved process of the present invention is well within the skill of an ordinary, skilled practitioner, features of apparatus design and construction not being part of the present invention.

Decomposition of alkylation acid in a pool of molten sulfur maintained at elevated temperature and composition of the gaseous stream thus obtained is illustrated by the following experiment: A resin kettle of about 2 liter working capacity, equipped with propeller agitator, heating mantle, thermometer and reflux condenser was charged with 3000 grams of molten sulfur. The sulfur was preheated to temperature of 250° to 275° C., the lowest temperature above the high viscosity region of the sulfur at which effective agitation could be provided. Alkylation spent acid was introduced into the vortex around the agitator shaft by means of a metering pump through an ⅛ tube at rate varied between 2 to 20 grams per minute, regulated to minimize foaming of the molten sulfur. Heat was supplied to maintain temperature of the sulfur at about 275° C. Acid feed was continued for about 8 hours. During that 8-hour period, periodic gas samples were taken and analyzed. The composition of these samples, on water free basis, was within the following ranges:

| Components | Volume Percent (Range of seven samples) |
|---|---|
| $SO_2$ | 89.7 to 93.0 |
| $CO_2$ | 4.0 to 5.5 |
| $CO$ | 1.1 to 2.2 |
| $H_2$ | none |
| $CH_4$ | trace |
| $H_2S$ | none to trace |
| $COS$ | 0.1 to 0.3 |
| $CS_2$ | trace to 0.04 |
| $O_2$ | trace |
| $N_2$ | trace |

A carbonaceous residue precipitated in the form of small, solid coke-like particles which were uniformly distributed in the molten sulfur. After cooling to about 130° to 140° C. the sulfur slurry was easily filtered through a coarse fritted glass filter, leaving a coarse particle size solid residue.

EXAMPLE

The following example illustrates a process for decomposing spent sulfuric acid to make a sulfur dioxide-containing gas stream, which incorporates a preferred embodiment of the improvement of the present invention.

With reference to FIG. 1, equipment employed includes reactor 2, sulfur condenser 5, sulfur separator 6, water condensor 9, water separator 10, pressure control valves 12 and 12a, drying tower 13, sulfur dioxide stripping column 16 with associated reflux condenser 19, post reactor 21, circulating pump 22, sulfur heater 24, and sulfur burner 28, together with associated lines and ducts and other auxiliary equipment. Equipment employed is constructed of corrosion resistant material.

Reactor 2 is a closed pressure reaction vessel, agitator-equipped and internally baffled. Reactor 2 contains 30,000 parts by weight of molten sulfur maintained at a temperature of about 370° C. Spent alkylation acid is introduced into reactor 2 through spent acid feed line 1 at a rate of 9,840 parts per hour, representing 9,212 parts per hour of sulfuric acid, 314 parts per hour of organic matter, and 314 parts per hour of water. Concurrently therewith, molten sulfur is introduced into reactor 2 through sulfur feed line 3 at the rate of 4,480 parts per hour. Reactor 2 and equipment associated therewith is maintained under superatmospheric pressure of about 7 atmospheres. Spent acid fed to reactor 2 is decomposed in the liquid sulfur contained therein to form 8,350 parts per hour of sulfur dioxide, 2,360 parts per hour of water, and 269 parts per hour of carbon.

Gaseous products leaving reactor 2 are passed via line 4 through sulfur condenser 5, which is a shell-and-tube type heat exchanger wherein the gas stream is cooled to about 140° C. to condense 2,668 parts of sulfur per hour. The gaseous stream from which sulfur has been condensed and the condensed sulfur are permitted to separate in sulfur separator 6, and the condensed sulfur is returned to reactor 2 via sulfur return line 7 which forms a lute. Sulfur generator 6 is an empty vessel with a bottom outlet for liquid sulfur and a top outlet for the gas stream.

The sulfur dioxide-containing gas stream from which sulfur has been condensed is then routed via line 8 to water condenser 9, a shell-and-tube type heat exchanger, wherein it is cooled to temperature of about 35° C. In water condenser 9 water is condensed at the rate of about 2,019 parts per hour. Together with the condensed water there is removed from water condenser 9 dissolved sulfur dioxide at the rate of about 220 parts per hour. Water and gas are routed from water condenser 9 to water separator 10 wherein aqueous and gaseous phases are separated. The gaseous phase is withdrawn from water separator 10 through pressure control valve 12 as a sulfur dioxide-containing gas stream containing between 90 to 100% $SO_2$, the balance being carbon dioxide, carbon monoxide and some water vapor. Optionally, the sulfur dioxide-containing gas stream released through pressure control valve 12 may be further dried, as by contacting it with strong sulfuric acid in drying tower 13.

Condensed water separated from the gaseous stream in water separator 10 is discharged therefrom through pressure control valve 12a and is fed through line 15 into sulfur dioxide stripping column 16 with associated reflux condenser 19, wherein it is heated and refluxed to strip the sulfur dioxide. Water from which sulfur dioxide has been stripped is discharged from sulfur dioxide stripping column 16 through water line 17 to the sewer.

Sulfur dioxide which has been stripped in stripping column 16 and is passed through reflux condenser 19 may be combined with the sulfur dioxide-containing gas stream passed through pressure control valve 12.

Molten sulfur is constantly withdrawn from sulfur reactor 2 via line 20 at the rate of about 290,400 parts per hour and passed through post reactor 21, wherein there is maintained a pool of molten sulfur representing about 290,400 parts of sulfur, providing retention time of about 1 hour. Sulfur dioxide generated within post reactor 28 is vented via line 8a into line 8 to be combined with the main stream of sulfur dioxide-containing gas generated in reactor 2 for introduction into water condenser 9. From post reactor 21 sulfur is withdrawn by means of circulating pump 22. The stream of sulfur discharged from circulating pump 22 is split into a first and a second stream. The first stream, representing 287,108 parts per hour of sulfur is routed via line 23 through sulfur heater 24, which is a shell-and-tube type heat exchanger, to be heated therein with hot gases of combustion generated in sulfur burner 28 to temperature of about 425° C. then to be returned to reactor 2 via line 25. The second stream representing 3,300 parts of sulfur per hour is routed through line 26 to sulfur burner 28, wherein it is burned in contact with air supplied through air feed line 27. Products of combustion generated in sulfur burner 28 containing about 13.4% by volume of sulfur dioxide are brought into indirect heat exchange contact with the sulfur circulated through sulfur heater 24, thereafter to be discharged through line 30 for optional use as sulfur dioxide feed stream for a contact sulfuric acid plant. Combustion on sulfur withdrawn from reactor 2 in sulfur burner 28 effects purge of carbonaceous residue accumulated in the pool of molten sulfur wherein reaction is conducted in reactor 2. The process upstream of pressure control valves 12 and 12a is conducted under pressure of about 7 atmospheres, absolute.

Figure 2:
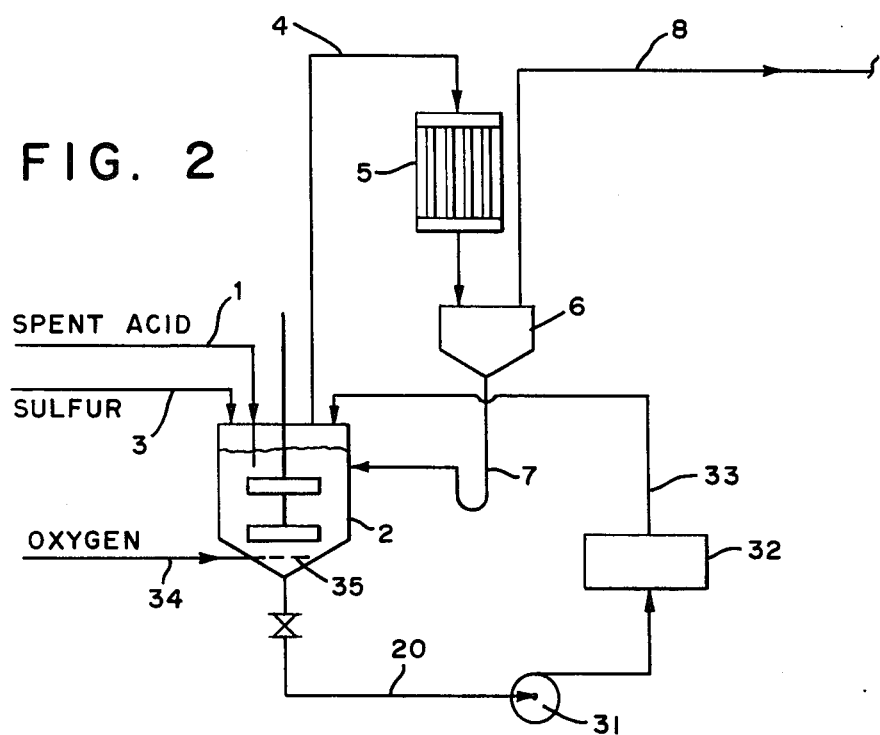

With reference to FIG. 2, there is illustrated another embodiment of a spent acid decomposition process incorporating the improvement of the present invention. In FIG. 2 gas treating equipment located downstream from sulfur separator 6 is not shown, but may be identical to that correspondingly illustrated in FIG. 1. In the embodiment shown by FIG. 2, temperatures and pressures are identical or similar to those indicated in connection with the discussion of the process shown in FIG. 1. Heat is supplied by burning sulfur directly in reactor 2 by feeding oxygen or oxygen-containing gas via oxygen feed line 34 by means of sparger 35 directly into the pool of molten sulfur maintained in reactor 2. Feeding oxygen-containing gases directly into the reactor as illustrated by FIG. 2 simultaneously effects heating of the pool of molten sulfur as well as purging of carbonaceous residues by burning them to carbon monoxide and/or carbon dioxide. In the event the spent acid employed contains inorganic impurities which cannot be removed by combusting them directly within reactor 2, one would provide filter 32 and associated filter pump 31, by means of which molten sulfur would be withdrawn from reactor 2 and passed through filter 32 wherein inorganic impurities or, optionally, organic impurities are removed, and the filtered sulfur is returned to reactor 2 via line 33.

Figure 3:
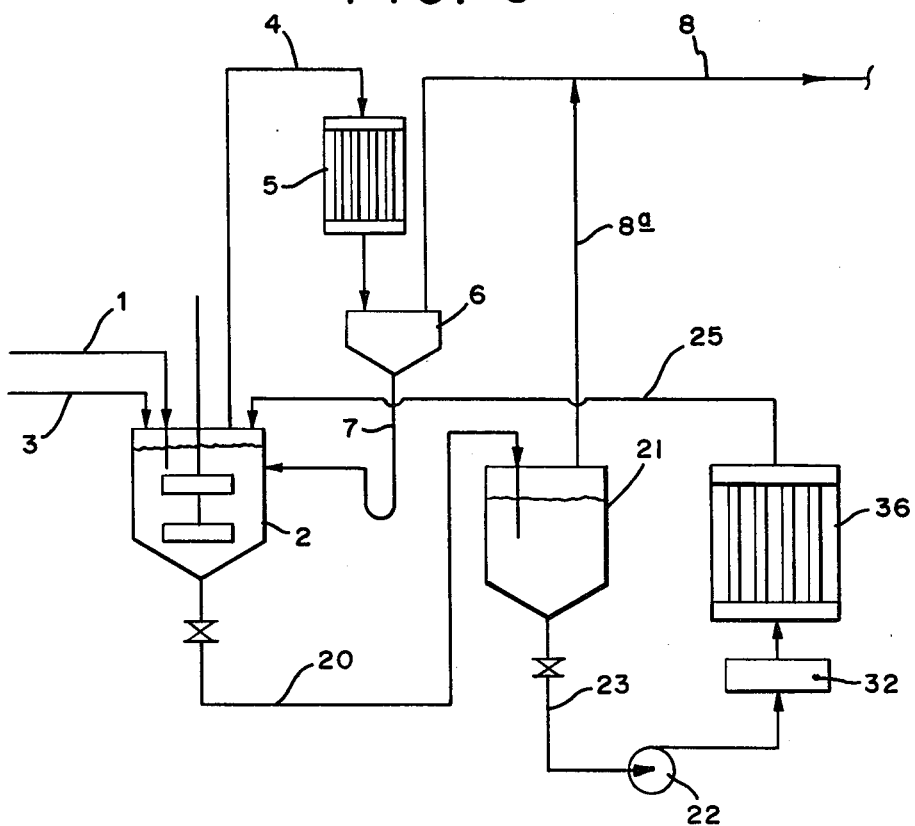

With reference to FIG. 3, there is illustrated a further embodiment of a spent acid decomposition process for recovering sulfur values incorporating the improvement of the present invention wherein heating of the sulfur is effected in a combustion-fired sulfur heater, and removal of solid residues from the pool of molten sulfur is effected by filtration. Equipment downstream from sulfur separator 6 is not shown, but may be identical to that shown in FIG. 1. Equipment employed in FIG. 3 omits the sulfur burner 28 and the sulfur heater 24 of FIG. 1 and substitutes therefor sulfur heater 36 wherein heating of the sulfur circulated therethrough is effected by combustion of, say, natural gas or oil. Between circulating pump 22 and indirectly fired sulfur heater 36, there is interposed sulfur filter 32 for removal of organic and inorganic impurities. Otherwise, operation of the process shown in FIG. 3 is the same as that illustrated by FIG. 1.

Since various changes may be made in carrying out the process of our invention without departing from its scope and essential characteristics, it is intended that all matter contained in the above description shall be interpreted as illustrative only, the invention being limited solely by the appended claims.

What is claimed is:

1. In the method for recovering sulfur values from spent sulfuric acid by decomposing it at elevated temperature in the presence of elemental sulfur to generate a sulfur dioxide-containing gas stream, the improvement which comprises:

a. introducing spent sulfuric acid into a pool of molten sulfur maintained at temperature of at least about 250° C, wherein said pool of molten sulfur furnishes both the reaction medium as well as the reductant for said sulfuric acid, to thereby generate a gaseous stream comprising sulfur dioxide, vaporous elemental sulfur, and water;

b. cooling said gaseous stream comprising sulfur dioxide, vaporous elemental sulfur, and water to temperature above the melting point of the sulfur but below about 160° C. to condense elemental sulfur therefrom, separating said condensed elemental sulfur and returning it to said pool of molten sulfur; followed by c. further cooling the gaseous stream from which elemental sulfur has been condensed to condense water therefrom, and separating the condensed water from the gaseous stream.

2. The improvement of claim 1 wherein the pool of molten sulfur is maintained at temperature above about 300° C.

3. The improvement of claim 2 wherein the gaseous stream comprising sulfur dioxide, vaporous elemental sulfur and water is cooled to temperature between about 120° and about 150° C. to condense elemental sulfur therefrom.

4. The improvement of claim 3 wherein the gaseous stream from which elemental sulfur has been condensed is cooled to temperature between ambient and about 80° C. to condense water therefrom.

5. The improvement of claim 4 wherein the steps of introducing spent sulfuric acid into the pool of molten sulfur and of cooling the gaseous stream generated thereby to condense sulfur therefrom are conducted under superatmospheric pressure between about 1 and about 100 atmospheres.

6. The improvement of claim 1 with the additional step of removing solid residue from the pool of molten sulfur into which the spent sulfuric acid is introduced.

7. The improvement of claim 6 wherein solid residue is removed by withdrawing a stream of molten sulfur from said pool of molten sulfur, passing it through a filter and returning the filtered stream to said pool of molten sulfur.

8. The improvement of claim 7 wherein said pool of molten sulfur is maintained at temperature above about 300° C., wherein the gaseous stream comprising sulfur dioxide, vaporous elemental sulfur and water is cooled to temperature between about 120° and about 150° C. to condense elemental sulfur therefrom, and wherein the gaseous stream from which elemental sulfur has been condensed is cooled to temperature between ambient and about 80° C. to condense water therefrom.

9. The improvement of claim 8 wherein the spent sulfuric acid is an aqueous sulfuric acid containing inorganic impurities.

10. The improvement of claim 9 wherein the spent aqueous sulfuric acid containing inorganic impurities is derived from the process for making titanium dioxide from titaniferous material.

11. The improvement of claim 6 wherein solid residue is removed from the pool of molten sulfur into which the spent sulfuric acid is introduced by purging a portion of said pool of molten sulfur, and feeding fresh sulfur to said pool of molten sulfur.

12. The improvement of claim 11 wherein said pool of molten sulfur is maintained at temperature above about 300° C., wherein the gaseous stream comprising sulfur dioxide, vaporous elemental sulfur and water is cooled to temperature between about 120° and about 150° C. to condense elemental sulfur therefrom, and wherein the gaseous stream from which elemental sulfur has been condensed is cooled to temperatures between ambient and about 80° C. to condense water therefrom.

13. The improvement of claim 12 wherein the spent sulfuric acid is an aqueous sulfuric acid containing inorganic impurities.

14. The improvement of claim 13 wherein the spent aqueous sulfuric acid containing inorganic impurities is derived from the process for making titanium dioxide from titaniferous material.

15. The improvement of claim 12 wherein the spent sulfuric contains carbonaceous impurities, and wherein sulfur purged from said pool of molten sulfur is burned and heat of combustion generated thereby is utilized to maintain said pool of molten sulfur at desired temperature.

16. The improvement of claim 15 wherein the steps of introducing spent sulfuric acid into the pool of molten sulfur and of cooling the gaseous stream generated thereby to condense sulfur therefrom are conducted under superatmospheric pressure between about 1 and about 100 atmospheres.

17. The improvement of claim 1 wherein the spent sulfuric acid contains carbonaceous impurities, and wherein said pool of molten sulfur is maintained at temperature above about 300° C. by introducing oxygen or oxygen-containing gas directly into said pool of molten sulfur to effect combustion of sulfur.

18. The improvement of claim 17 wherein the gaseous stream comprising sulfur dioxide, vaporous elemental sulfur and water is cooled to temperature between about 120° and about 150° C. to condense elemental sulfur therefrom, and wherein the gaseous stream from which elemental sulfur has been condensed is cooled to temperature between ambient and about 80° C. to condense water therefrom.

19. The improvement of claim 8 wherein the steps of introducing spent sulfuric acid into the pool of molten sulfur and of cooling the gaseous stream generated thereby to condense sulfur and water therefrom are conducted under superatmospheric pressure between about 1 and about 100 atmospheres.

* * * * *